Aug. 7, 1962   A. R. YANNUZZI   3,048,106

PLUG-IN DEVICE (QUICK RELEASE)

Filed Sept. 2, 1960

*INVENTOR.*
ANGELO R. YANNUZZI

BY
S. J. Rotondi, A. T. Dupont
and S. Dubroff  ATTORNEYS.

3,048,106
PLUG-IN DEVICE (QUICK RELEASE)
Angelo R. Yannuzzi, Philadelphia, Pa., assignor to the United States of America as represented by the Secretary of the Army
Filed Sept. 2, 1960, Ser. No. 53,851
4 Claims. (Cl. 102—45)
(Granted under Title 35, U.S. Code (1952), sec. 266)

The invention described herein may be manufactured and used by or for the Government for governmental purposes without the payment to me of any royalty thereon.

This invention relates to an improved coupling from an ignition transmission line to a projectile or cartridge case, for use in recoilless rifles which do not have breech blocks. This invention provides coupling means which afford a high degree of safety to the operator, may be connected to and disconnected quickly and safely from the round of ammunition, and provides a simply constructed device which will withstand rough handling while still adequately performing.

In recoilless rifles having no breech blocks, means for igniting the propellant usually comprise a transmission line containing the igniter and connections for attaching to the round and to the triggering mechanism. The igniter is set off at the triggering mechanism and travels through the transmission line to the cartridge.

Prior art connecting means consisted of threaded connections at each end of the line. However, in case of misfire or if a gunner wished to unload a round for transfer purposes he had to manually unscrew the connections before replacement of the round could be made. Then a new transmission line or a new cartridge must be inserted. This procedure was time consuming as well as exposing the gunner to a high degree of danger from an accidentally detonating cartridge and enemy fire.

This invention allows for quick and safe connect and disconnect operations by a single push to connect and a push and a pull to disconnect.

The invention will be better understood from the following description when considered in connection with the accompanying drawings and its scope is indicated by the appended claims.

Referring to the drawings.

Figure 1:
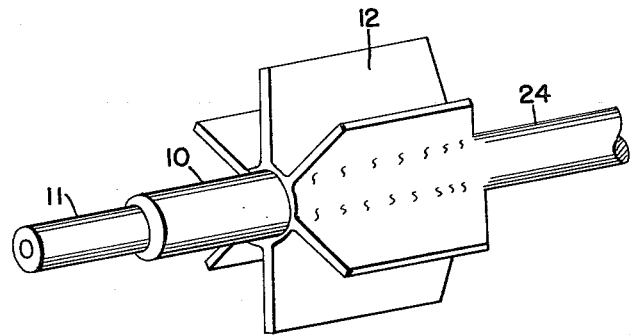
FIG. 1 is a perspective of the coupling device connecting an ignition transmission line to a projectile.
Figure 2:
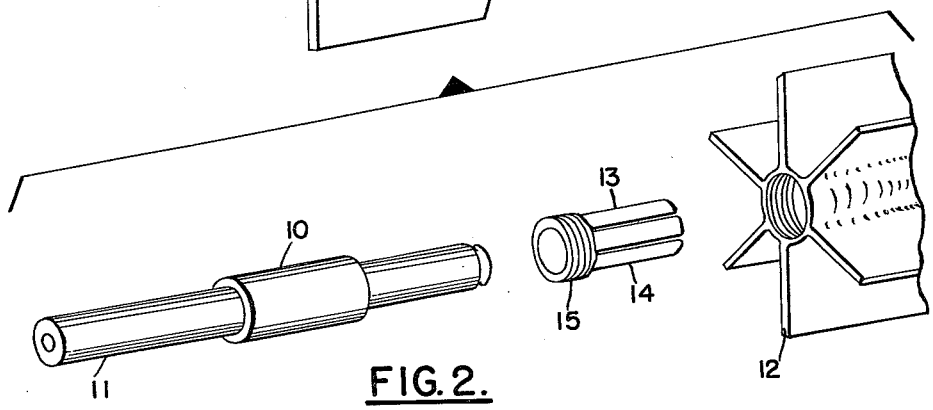
FIG. 2 is an exploded perspective of FIG. 1 showing the projectile, the transmission line, the first connector element and the second connector element.

The first connnector element 10 has provision at its rear end for joinder of the propellant ignition transmission line 11. Any suitable means for connecting the two together may be used, such as threads, crimping, adhesive. FIG. 2 shows the second connector element 13 prior to assembly to the projectile 12. This second connector element has forwardly extending tine like segments 14 and a threaded portion 15 for connection to the projectile 12.

Figure 3:
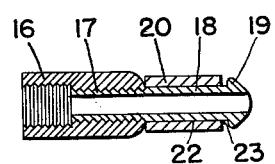
FIG. 3 is a sectional view of the first connector element through its longitudinal axis.

In the embodiment shown in FIG. 3 the first connector element is constructed in three parts. A first part, the rear portion or ignition transmission line housing 16 is adapted at its rear end to accept the ignition transmission line (in this case threads are used), and threaded at its forward portion 17 to accept cylindrical member 18. Cylindrical member 18 has an abutment shoulder 19. The third component is a collar member 20 which fits closely and slidably over the outside diameter of the cylindrical member 18. This collar member 20 has an outside diameter slightly greater than the diameter of the abutment shoulder 19.

Figure 4:
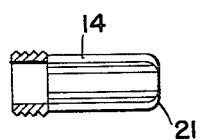
FIG. 4 is a partial sectional view of the second connector element through its longitudinal axis.
Figure 5:
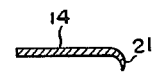
FIG. 5 is a section view of a tine of FIG. 4, and its corresponding tooth.

The second connector member, shown in FIG. 4 has relatively thin tine like members 14 which have an inwardly extending portion at their forward end which form teeth 21. These tine like segments are thin enough to be springy and have an inside diameter at the teeth slightly less than the diameter of the abutment shoulder 19 but slightly greater than the outside diameter 22 of the long cylindrical member 18. After assembly of the first connector element the long cylinder member 18 is screwed onto an ignition transmission line housing 16, a small space 23 is left between the collar 20 and the abutment shoulder 19.

In operation, the second connector element is assembled to the projectile prior to the loading of the projectile with its propellant powder and after the projectile ignition charge is inserted in its boom member 24. After loading of the projectile into the gun the first connector element is inserted into the second connector element until the abutment shoulder 19 passes the teeth 21. The collar 20 having a larger diameter than the abutment shoulder will be forced back and the teeth will then spring inward into the space 23 left by the rearward movement of the collar 20. Since the diameter of the collar 20 is only slightly in excess of the abutment shoulder 19, in order to disassemble the first connector element, it is only necessary to push the first connector element until the teeth 21 spring out over and onto the outside diameter of the collar 20. Then, by abruptly pulling the first connector element outward, the teeth 21 will spring over the abutment shoulder 19 and the transmission line is disconnected. The disconnect occurs because the teeth 21 cause a pressure on the collar 20 and cause the collar to slide forward as the first connector element is removed, thereby eliminating the space 23.

It has been found that when the collar 20 has an outside diameter of about .01 inch larger than the abutment shoulder 19 good results are obtained. Larger diameter may be permissible depending on the ability of the teeth 21 to spring out and over the collar and then submit enough inward force to push the collar forward on the disconnect cycle. With sharp teeth 21 a space of about .02 inch between the collar 20 and the abutment shoulder 19 has proven successful.

I claim:
1. In combination with a cartridge, and a propellant transmission line, the improvement for facilitating quick connect and disconnect therebetween, said improvement comprising: a first connector element for connection to a propellant transmission line, a second connector element for attachment to a cartridge, said first connector element having connecting means for effecting connection to a transmission line, a hollow cylindrical member having a smooth outer surface with an abutment shoulder at one end, means for connecting said connecting means with said hollow cylindrical member, a collar slidably surrounding substantially all but a small longitudinal portion of said hollow cylindrical portion and having an outside diameter larger than the diameters of said abutment shoulder, said second connector element having at a rear end means for effecting connection to a cartridge and at its forward end forwardly extending tine like segments, said segments having inwardly extending portions at their forwardmost portions, said inwardly extending portions having a thickness substantially equal to said small longitudinal portion of said hollow cylindrical portion not surrounded by said collar.

2. The combination of claim 1 where said means for connecting said connecting means with said hollow cylindrical member is a projection recess type connection.

3. The combination of claim 1 in which said second connector element inwardly extending portions are sharp teeth forming a diameter larger than the smooth surface of said hollow cylindrical member and smaller than said abutment shoulder on said hollow cylindrical member.

4. The combination of claim 1 in which said collar has a diameter about 0.01 inch larger than said abutment shoulder.

References Cited in the file of this patent

UNITED STATES PATENTS

| | | |
|---|---|---|
| 2,920,533 | Musser | Jan. 12, 1960 |
| 2,944,241 | Londell | July 5, 1960 |
| 2,949,061 | Bendett et al. | Aug. 10, 1960 |